(12) United States Patent
Sugita (10) Patent No.: US 10,564,407 B2
(45) Date of Patent: Feb. 18, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 15/855,121

(22) Filed: Dec. 27, 2017

(65) Prior Publication Data
US 2018/0180859 A1     Jun. 28, 2018

(30) Foreign Application Priority Data

Dec. 28, 2016  (JP) .................................. 2016-255053

(51) Int. Cl.
| | | |
|---|---|---|
| G02B 15/14 | (2006.01) | |
| G02B 7/04 | (2006.01) | |
| G02B 15/177 | (2006.01) | |
| G02B 15/173 | (2006.01) | |

(52) U.S. Cl.
CPC ............... *G02B 15/14* (2013.01); *G02B 7/04* (2013.01); *G02B 15/173* (2013.01); *G02B 15/177* (2013.01)

(58) Field of Classification Search
CPC . G02B 7/04; G02B 7/09; G02B 15/14; G02B 15/173; G02B 15/177; G02B 15/22

USPC ................... 359/738, 739, 740, 694
See application file for complete search history.

(56) References Cited

U.S. PATENT DOCUMENTS

| | | |
|---|---|---|
| 9,110,278 B2 | 8/2015 | Sugita |
| 9,250,424 B2 | 2/2016 | Sugita |
| 9,268,118 B2 | 2/2016 | Sugita |
| 9,268,119 B2 | 2/2016 | Sugita |
| 9,465,203 B2 | 10/2016 | Sugita |
| 9,575,391 B2 | 2/2017 | Sugita |
| 9,638,904 B2 | 5/2017 | Sugita |
| 2008/0285146 A1 | 11/2008 | Shirasuna |
| 2014/0198393 A1* | 7/2014 | Sugita .................. G02B 15/177 359/680 |
| 2016/0131879 A1 | 5/2016 | Sugita |
| 2017/0242228 A1 | 8/2017 | Sugita |
| 2017/0322399 A1 | 11/2017 | Sugita |
| 2017/0351113 A1 | 12/2017 | Inoue et al. |

FOREIGN PATENT DOCUMENTS

| | | |
|---|---|---|
| JP | 2012-063403 A | 3/2012 |
| JP | 2012-181526 A | 9/2012 |

* cited by examiner

*Primary Examiner* — Marin Pichler
(74) *Attorney, Agent, or Firm* — Carter, DeLuca & Farrell LLP (57) ABSTRACT

A zoom lens of the present invention is a zoom lens including a variable stop whose aperture diameter is variable in zooming, the variable stop is a stop which determines a minimum f-number of the zoom lens at least at one of zoom positions in an entire zoom range, and the aperture diameter of the variable stop is variable in focusing at least at a telephoto end in the entire zoom range.

13 Claims, 9 Drawing Sheets

FIG. 11

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same.

Description of the Related Art

In recent years, an image pickup optical system used for an image pickup apparatus has been desired to be a zoom lens having a high optical performance over the entire zoom range and the entire object distance range. Moreover, many zoom lenses have been desired to achieve a constant minimum f-number over the entire zoom range so as not to change the exposure due to zooming. A zoom lens capable of achieving a constant minimum f-number in zooming has been conventionally proposed (U.S. Patent Application Publication No. 2008/0285146).

The zoom lens in U.S. Patent Application Publication No. 2008/0285146 includes lens units which respectively have positive, negative, positive, and positive refractive powers and which are arranged in this order from the object side to the image side. In order to achieve the constant minimum f-number in zooming, a variable stop whose aperture diameter changes along with zooming is disposed in an optical path. Meanwhile, a normal zoom lens causes great aberration variations, particularly, a spherical aberration variation by focusing at the telephoto end. The spherical aberration variation caused by focusing at the telephoto end tends to be great particularly in a zoom lens capable of achieving a constant minimum f-number in zooming.

A zoom lens has been conventionally proposed which reduces the aperture diameter of an aperture stop in focusing from infinity to the minimum object distance in order to correct aberrations in a good manner in the focusing (Japanese Patent Application Laid-Open No. 2012-063403). Japanese Patent Application Laid-Open No. 2012-063403 discloses that the zoom lens includes lens units which respectively have positive, negative, positive, negative, negative, and positive refractive powers and which are arranged in this order from the object side to the image side, and the aperture diameter of the aperture stop can be changed in focusing.

When the aperture diameter of the aperture stop is changed along with zooming to achieve the constant minimum f-number in zooming, the aperture diameter is large at the telephoto end. This increases the aberration variations, particularly, the spherical aberration variation in focusing at the telephoto end. In order to obtain a zoom lens capable of achieving a constant minimum f-number in zooming and having small aberration variations in focusing, it is important to appropriately set the aperture diameter of the aperture stop in zooming and focusing.

SUMMARY OF THE INVENTION

An object of the present invention is to provide a zoom lens capable of achieving a constant minimum f-number in zooming and having small aberration variations in focusing.

A zoom lens of the present invention is a zoom lens including a variable stop whose aperture diameter is variable in zooming, the variable stop is a stop which determines a minimum f-number of the zoom lens at least at one of zoom positions in an entire zoom range, and the aperture diameter of the variable stop is variable in focusing at least at a telephoto end in the entire zoom range.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens of the present invention includes a variable stop whose aperture diameter is variable in zooming, and the variable stop determines the minimum f-number of the zoom lens at least at one of zoom positions (telephoto end) in an entire zoom range. Furthermore, the aperture diameter of the variable stop is variable in focusing. Specifically, the aperture diameter of the variable stop increases in zooming from a wide end to the telephoto end, and the aperture diameter of the variable stop decreases in focusing from infinity to the minimum object distance at the telephoto end.

Figure 1:
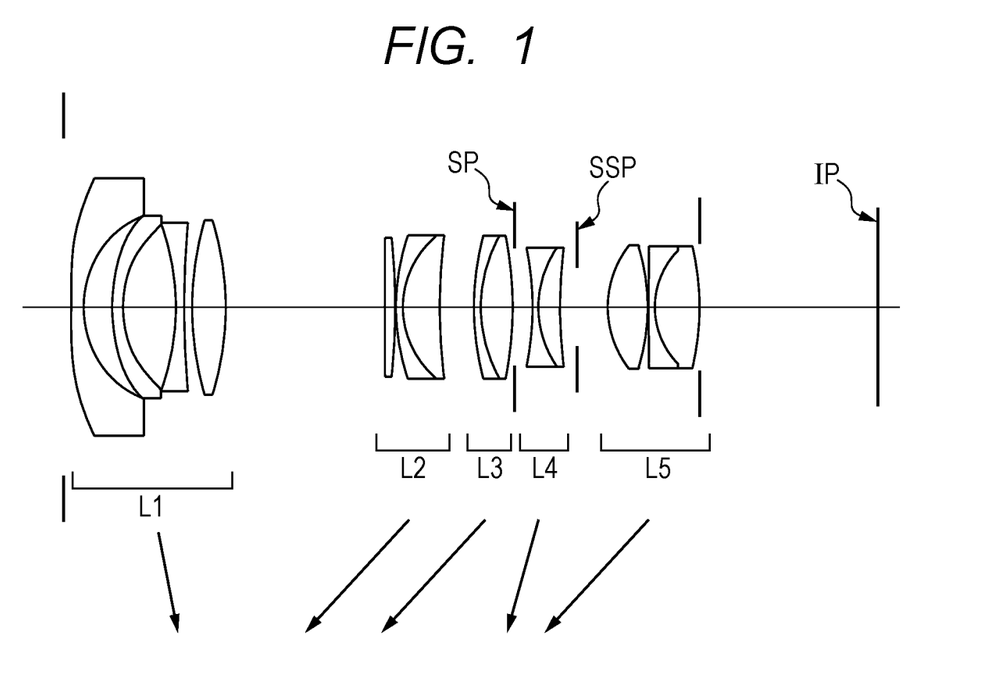
FIG. 1 is a lens cross-sectional view of a zoom lens in Embodiment 1 of the present invention.
Figure 2A:
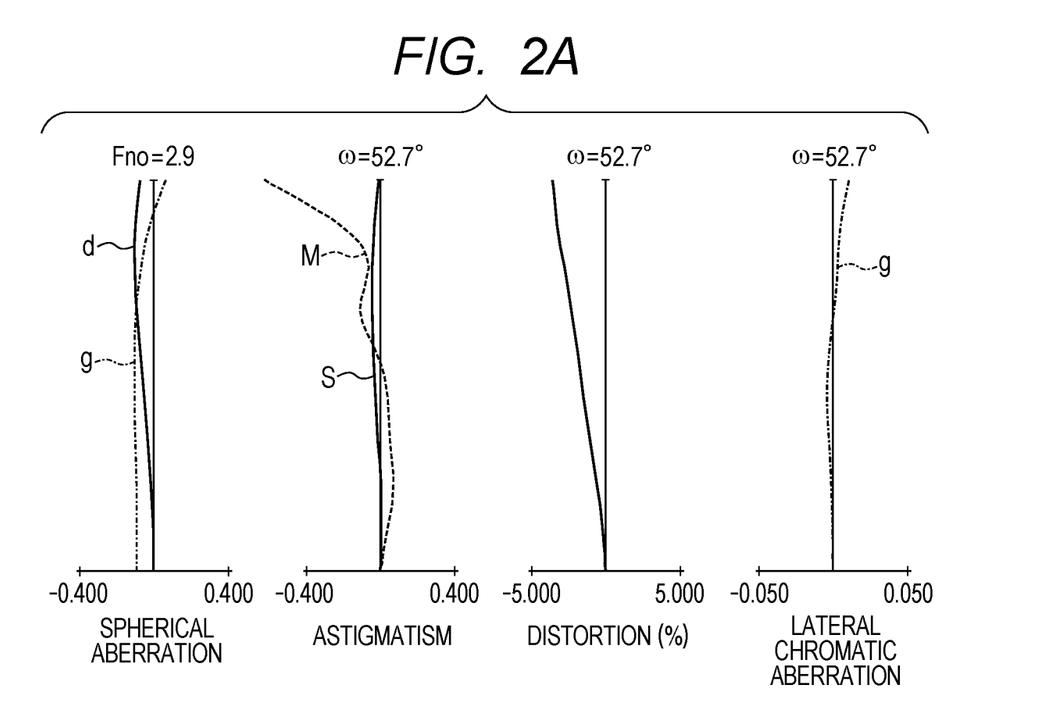
FIG. 2A is aberration graphs of the zoom lens in Embodiment 1 of the present invention at the wide end in the case where the object distance is infinity.
Figure 2B:
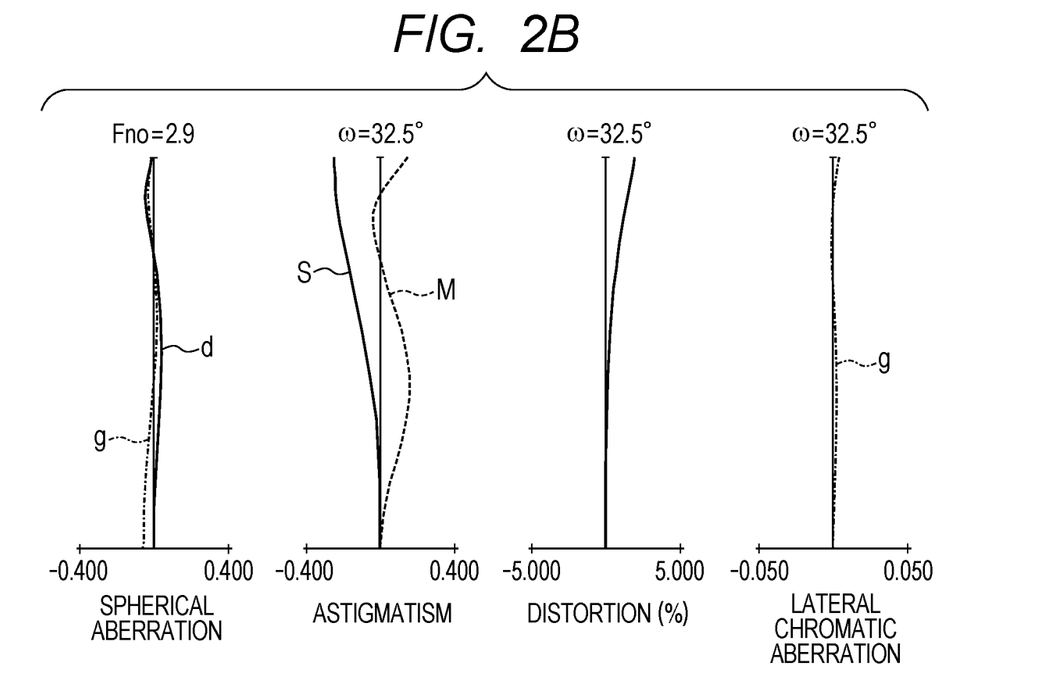
FIG. 2B is aberration graphs of the zoom lens in Embodiment 1 of the present invention at the telephoto end in the case where the object distance is infinity.
Figure 3A:
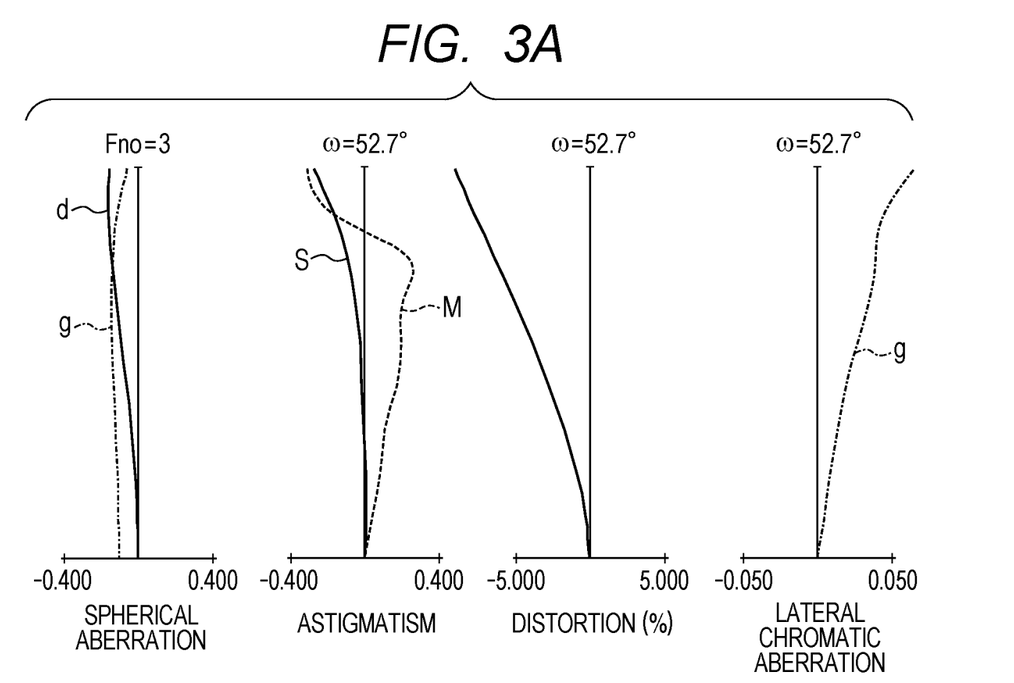
FIG. 3A is aberration graphs of the zoom lens in Embodiment 1 of the present invention at the wide end in the case where the object distance is the minimum object distance.
Figure 3B:
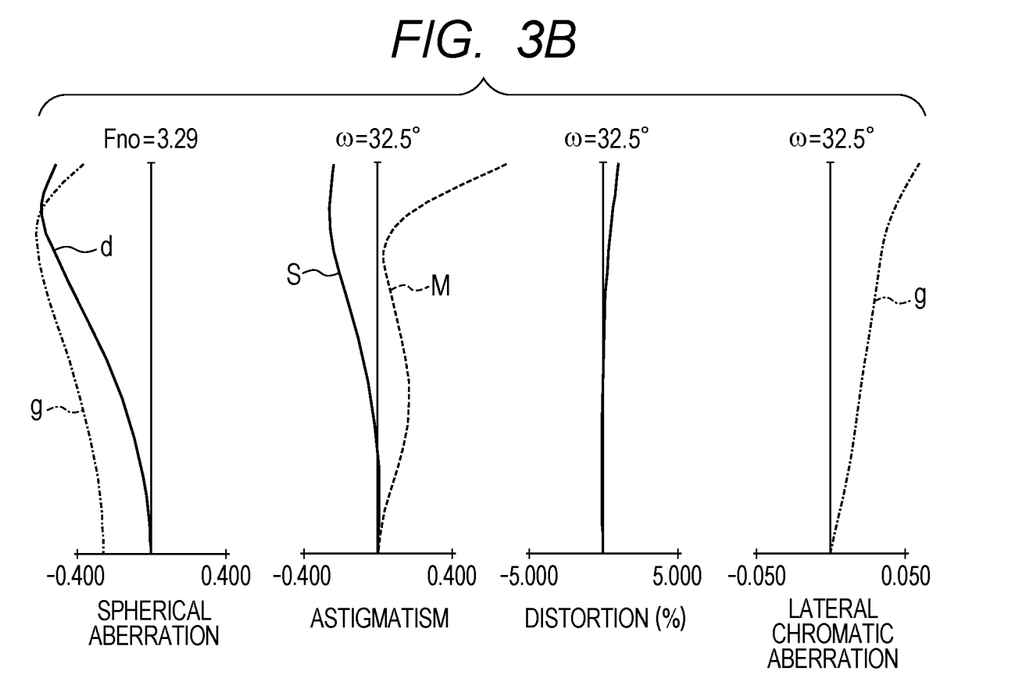
FIG. 3B is aberration graphs of the zoom lens in Embodiment 1 of the present invention at the telephoto end in the case where the object distance is the minimum object distance.
Figure 4:
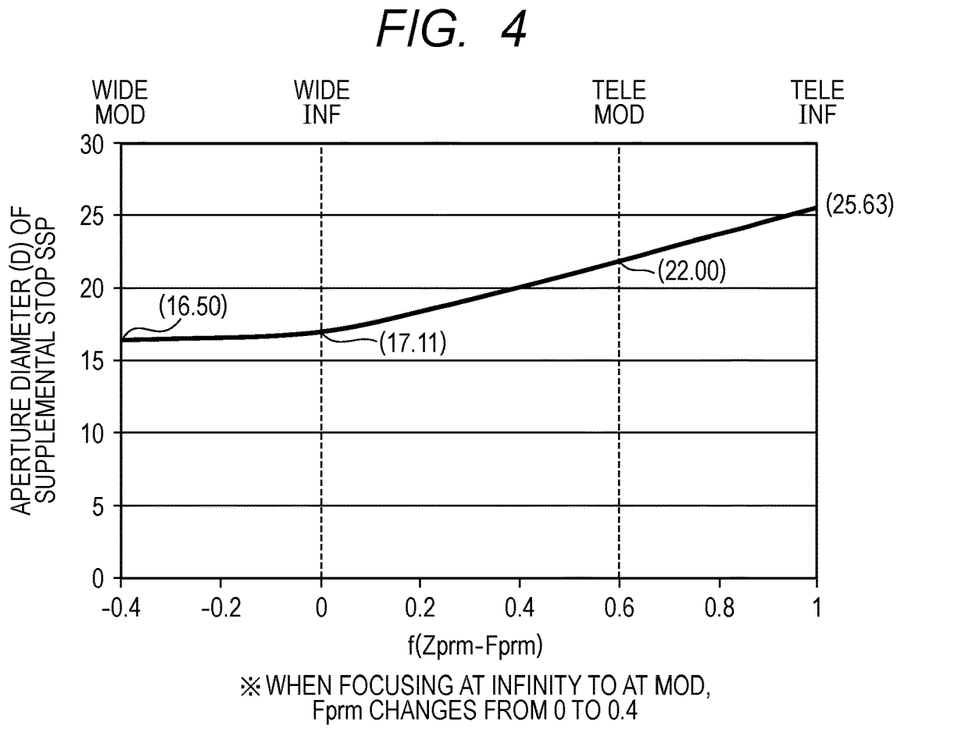
FIG. 4 is a graph explaining a function f relating to the aperture diameter of a variable stop in Embodiment 1 of the present invention.

FIG. 1 is a lens cross-sectional view of a zoom lens in an embodiment 1 of the present invention at the wide end (short focal length end). FIGS. 2A and 2B are aberration graphs of the zoom lens in Embodiment 1 at the wide end and the telephoto end (long focal length end) in the case where the focus is at infinity. FIGS. 3A and 3B are aberration graphs of the zoom lens in Embodiment 1 at the wide end and the telephoto end in the case where the focus is at the minimum object distance. FIG. 4 is a graph explaining the aperture diameter of a variable stop according to Embodiment 1.

Figure 5:
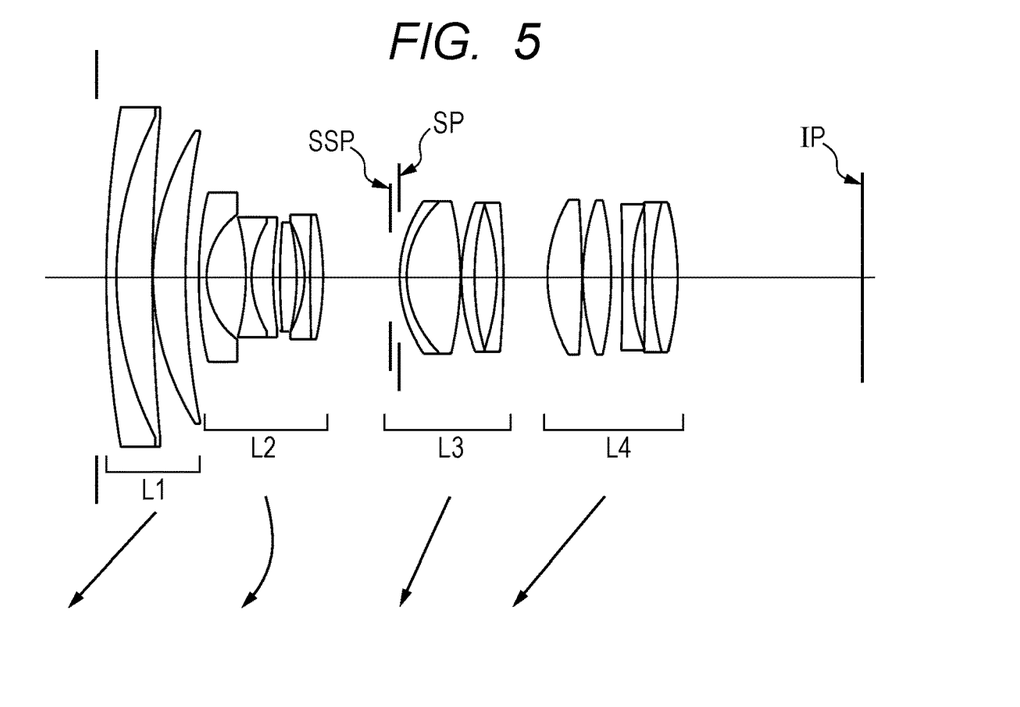
FIG. 5 is a lens cross-sectional view of a zoom lens in Embodiment 2 of the present invention.
Figure 6A:
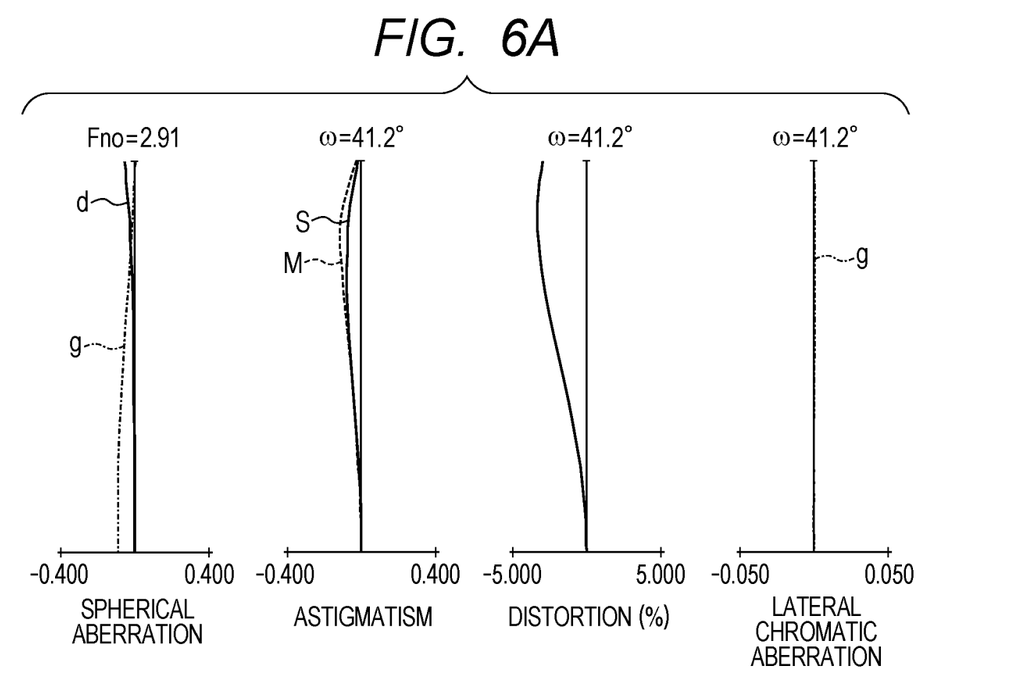
FIG. 6A is aberration graphs of the zoom lens in Embodiment 2 of the present invention at the wide end in the case where the object distance is infinity.
Figure 6B:
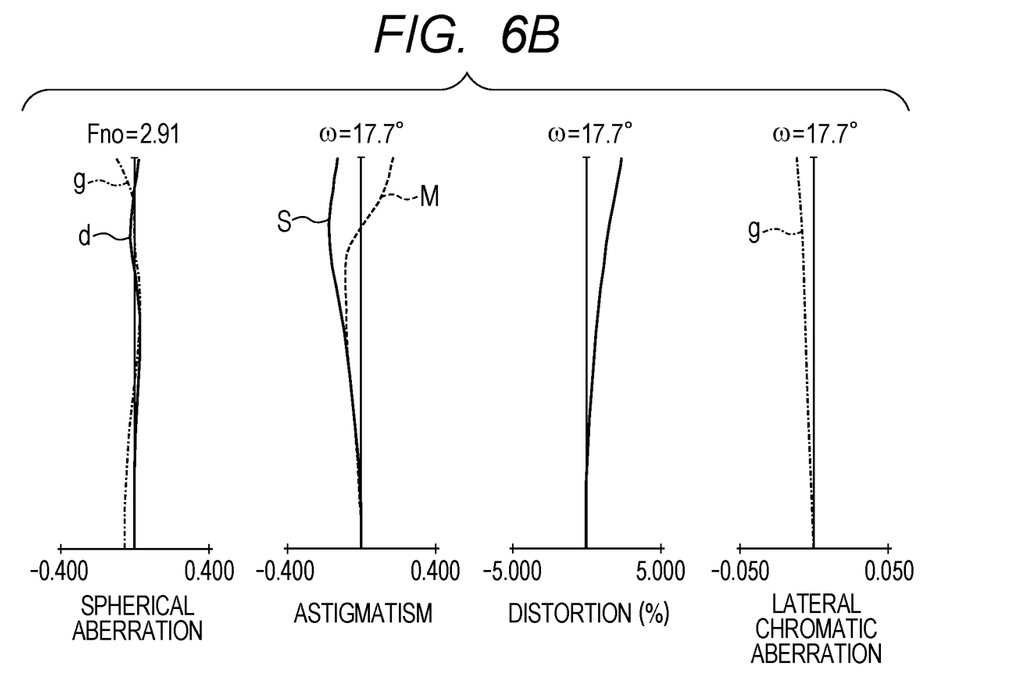
FIG. 6B is aberration graphs of the zoom lens in Embodiment 2 of the present invention at the telephoto end in the case where the object distance is infinity.
Figure 7A:
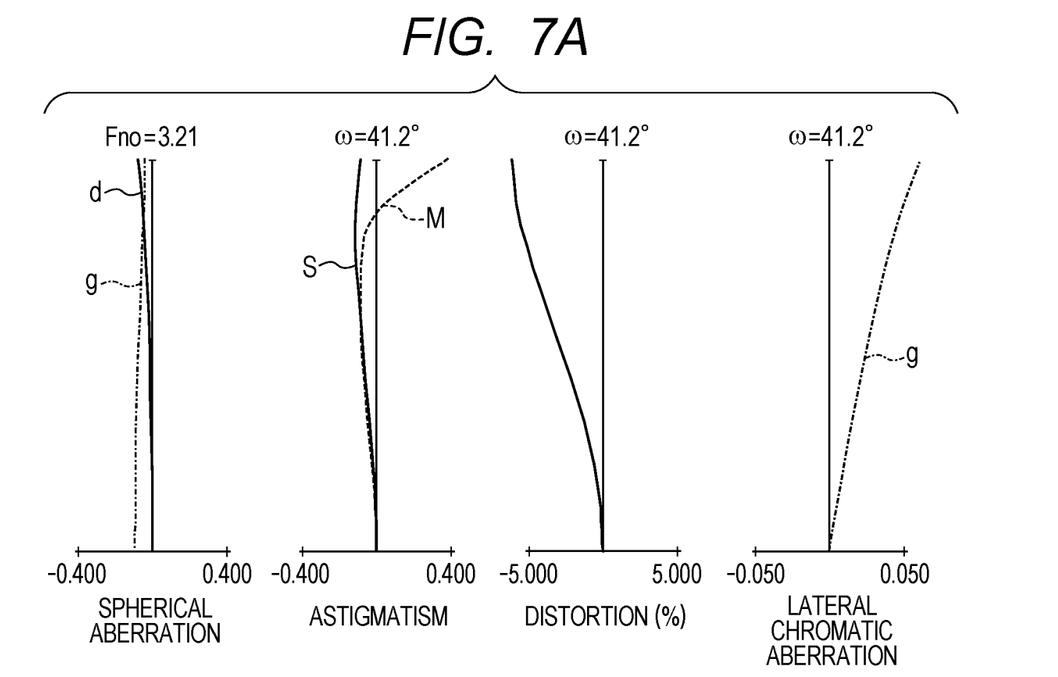
FIG. 7A is aberration graphs of the zoom lens in Embodiment 2 of the present invention at the wide end in the case where the object distance is the minimum object distance.
Figure 7B:
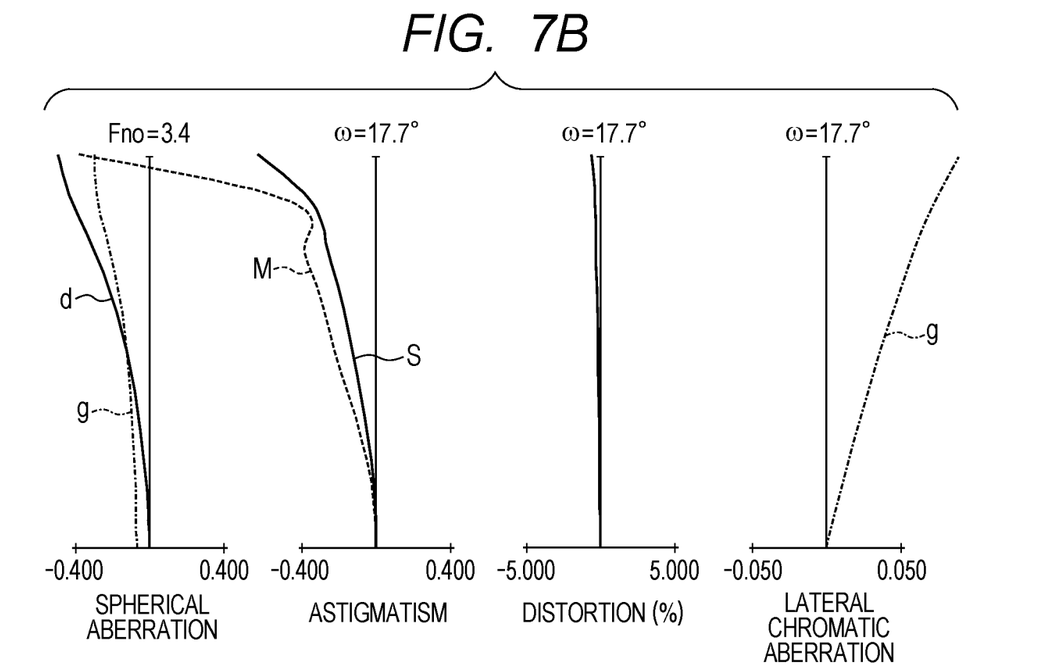
FIG. 7B is aberration graphs of the zoom lens in Embodiment 2 of the present invention at the telephoto end in the case where the object distance is the minimum object distance.
Figure 8:
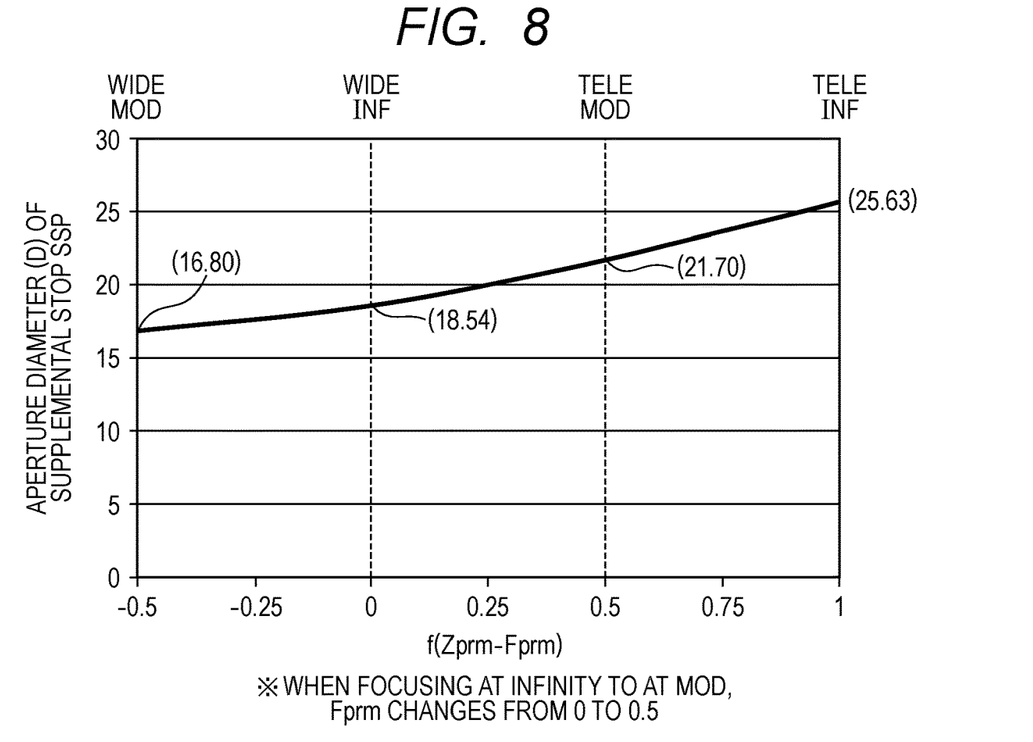
FIG. 8 is a graph explaining a function f relating to the aperture diameter of a variable stop in Embodiment 2 of the present invention.

FIG. 5 is a lens cross-sectional diagram of a zoom lens in an embodiment 2 of the present invention at the wide end. FIGS. 6A and 6B are aberration graphs of the zoom lens in Embodiment 2 at the wide end and the telephoto end in the case where the focus is at infinity. FIGS. 7A and 7B are aberration graphs of the zoom lens in Embodiment 2 at the wide end and the telephoto end in the case where the focus is at the minimum object distance. FIG. 8 is a graph explaining the aperture diameter of a variable stop according to Embodiment 2.

Figure 9:
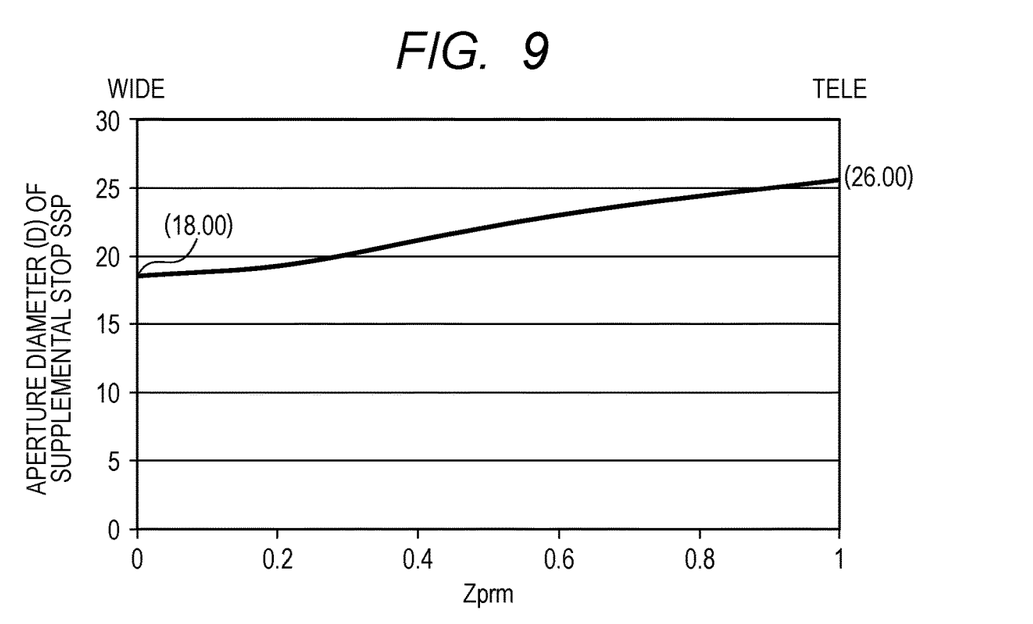
FIG. 9 is an explanatory graph of a relationship of the aperture diameter of a variable stop in a zoom range in a conventional example.
Figure 10A:
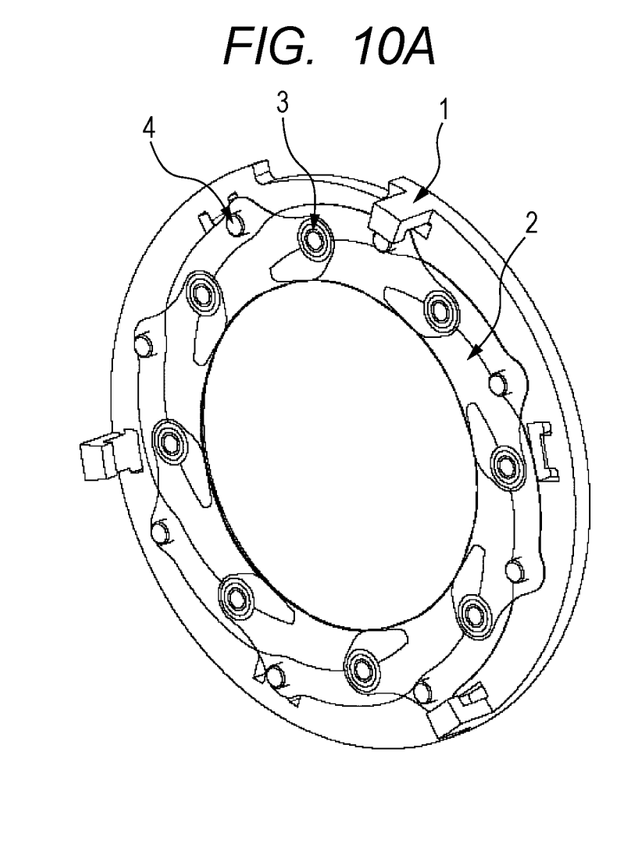
FIG. 10A is an explanatory view of a mechanical linkage mechanism of the variable stop.
Figure 10B:
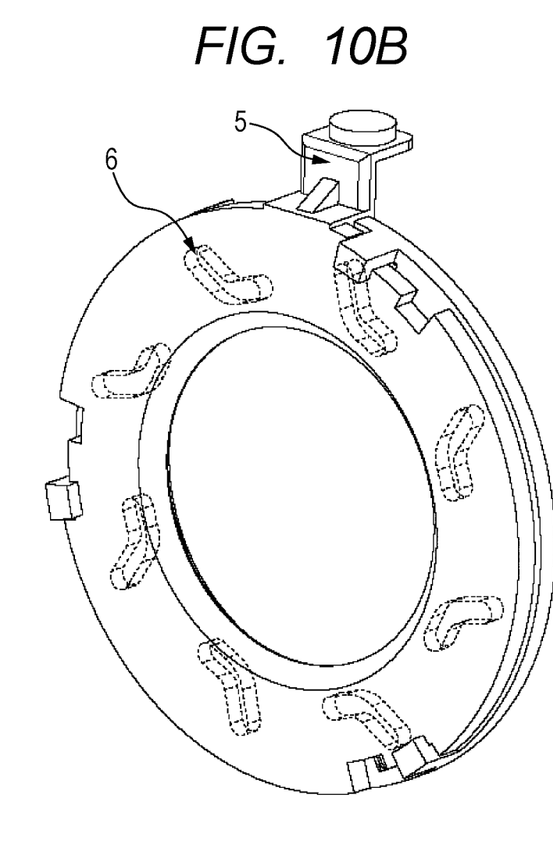
FIG. 10B is an explanatory view of a mechanical linkage mechanism of the variable stop.
Figure 11:
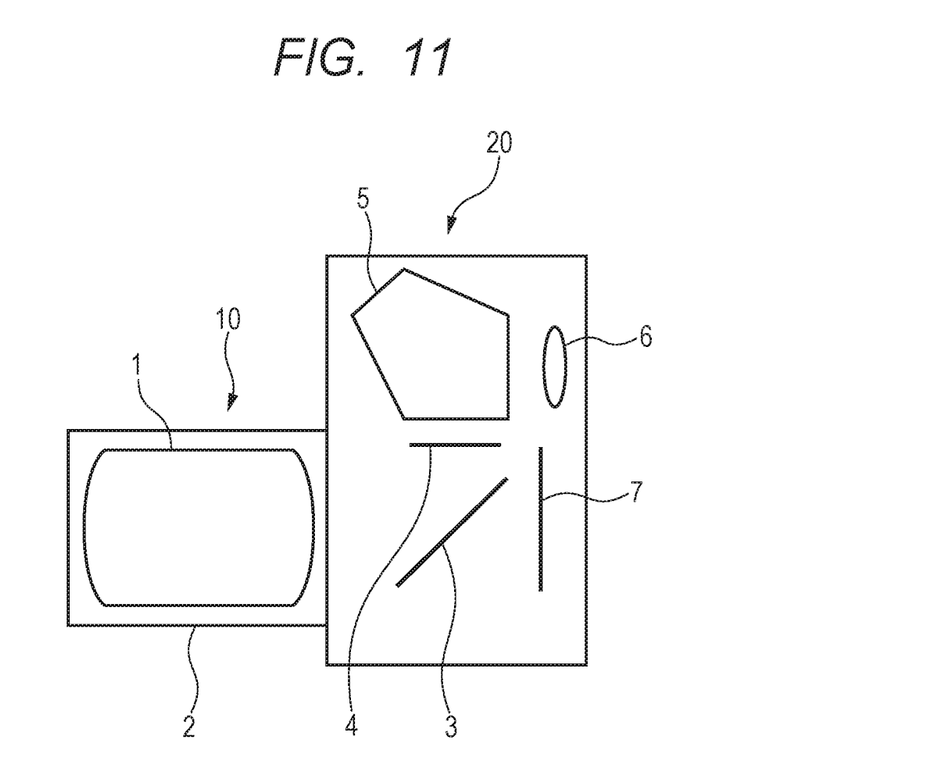
FIG. 11 is a schematic diagram of a main portion of an image pickup apparatus in the present invention.

FIG. 9 is an explanatory graph of a change in the aperture diameter of a conventional aperture stop. FIGS. 10A and 10B are explanatory views of a mechanical linkage mechanism and illustrate the change in the aperture diameter of the variable stop. FIG. 11 is a schematic diagram of a main portion of an image pickup apparatus in the present invention.

The zoom lens in each embodiment is an image pickup optical system used in an image pickup apparatus such as a video camera, a digital camera, a monitoring camera, and a TV camera. In the lens cross-sectional views, the left side is an imaged object side (object side) (front side) and the right side is an image side (rear side). In the lens cross-sectional views, reference sign Li denotes an i-th lens unit.

In the lens cross-sectional view of each embodiment, reference sign SP denotes a main stop which determines a light flux at the minimum f-number. Reference sign SSP denotes a supplemental stop (variable stop) whose aperture diameter is variable. Reference sign IP denotes an image plane. The image plane IP corresponds to an image pickup surface of a solid-state image pickup element (photoelectric conversion element) such as a CCD sensor or a CMOS sensor when the zoom lens is used as an image pickup optical system of a video camera or a digital camera and corresponds to a film surface when the zoom lens is used as an image pickup optical system of a silver-halide film camera. In the aberration graphs, reference sign Fno denotes the f-number, and ω denotes a half angle of view (degree). In the spherical aberration, the solid line d indicates the d line (wavelength 587.6 nm) and the two-dot chain line g indicates the g line (wavelength 435.8 nm).

In the astigmatism, the dotted line M indicates the meridional image plane at the d line and the solid line S indicates the sagittal image plane at the d line. In the distortion aberration, the d line is illustrated. In the lateral chromatic aberration, the g line relative to the d line is illustrated. In the lens cross-sectional views, the arrows indicate the directions in which the respective lens units move in the zooming from the wide end to the telephoto end. Note that the wide end and the telephoto end in the following embodiments each refer to a zoom position in the case where a variable magnification lens unit is located at one of two ends of a range in which the variable magnification lens unit is allowed to move along the optical axis by a mechanism.

Generally, the zoom lens has such a characteristic that, when the zoom lens focuses from infinity to the minimum object distance, a defocus state (movement of the image plane position when the object distance is infinity) is great at the telephoto end at which the focal length is longer than that at the wide end. As a result, an incidence height h of a light beam on an axis passing the lenses changes greatly in the focusing and the spherical aberration variation tends to be great.

In a zoom lens in which the minimum f-number of the zoom lens is constant in zooming, Fno=D/f is established, where D is the aperture diameter of the aperture stop and f is the focal length of the zoom lens. Accordingly, the aperture diameter D at the wide end needs to be set small while the aperture diameter D at the telephoto end needs to be set large and, to achieve this, an aperture stop whose aperture diameter is variable needs to be used.

In this case, at the telephoto end, the incidence height h of the light beam on the axis in each of the lenses near the aperture stop is high. When the incidence height h is high, the spherical aberration variation tends to occur. When the minimum f-number is made to be constant in zooming, the aperture diameter of the aperture stop is changed along with zooming. In this description, the zoom range from the wide end to the telephoto end is normalized to a change from 0 to 1 for the sake of simplification.

FIG. 9 depicts the relationship between the aperture diameter of the aperture stop and a zoom position Zprm which is a certain zoom position in zooming. As illustrated in FIG. 9, the aperture diameter of the aperture stop is, for example, 18.00 at the wide end (Zprm=0) (WIDE) and is, for example, 26.00 at the telephoto end (Zprm=1) (TELE).

Moreover, FIGS. 10A and 10B are the schematic views of the main portion of the linkage mechanism which changes the aperture diameter of the aperture stop in the zoom lens in which zooming is performed by turning a zoom operation ring. In FIGS. 10A and 10B, reference numeral 1 denotes a stop base and multiple stop blades 2 are stored in (attached to) the stop base 1. A stop blade rotation shaft 3 and a stop blade positioning pin 4 are attached to each stop blade 2. Reference numeral 5 denotes a stop rotation plate and stop cam grooves 6 are provided on the stop base 1 side of the stop rotation plate 5. The stop blade positioning pins 4 are fitted into the stop cam grooves 6, respectively.

Rotating the stop rotation plate 5 according to a monotonously increasing-decreasing function for the zoom position Zprm causes the stop blade positioning pins 4 to move along the stop cam grooves 6 and the inner diameter of a circle formed by the multiple stop blades 2 thereby changes.

The present invention uses the variable stop whose aperture diameter is variable. In the zoom lens of the present invention, the aperture diameter of the variable stop is changed along with not only zooming but also focusing from infinity to the minimum object distance. Specifically, driving is performed in such a direction that the aperture diameter of the variable stop is slightly reduced in the focusing from infinity to the minimum object distance, and the spherical aberration which occurs in an area closest to a pupil when the focus is at the minimum object distance is thereby reduced on the telephoto side. A zoom lens in which the spherical aberration variation is small in the entire zoom range and the entire focus range is thereby obtained.

Next, a configuration of the zoom lens of the present invention is described. The zoom lens of the present invention includes the variable stop whose aperture diameter is variable depending on zooming, and the variable stop determines the minimum f-number (Fno) of the zoom lens at least at one of the zoom positions in the entire zoom range. Moreover, the zoom lens is characterized such that the aperture diameter of the variable stop in this case is variable depending on the focusing, according to a predetermined function. Due to this characteristic, the aperture diameter of the variable stop is slightly reduced in a portion where the spherical aberration greatly varies in zooming and focusing (zoom position and focus position), and the spherical aberration occurring in the area closest to the pupil is thereby cut. Thus, a high optical performance is obtained in the entire focus range.

Next, a more preferable configuration of the zoom lens of the present invention is described. The aperture diameter of the variable stop used in the zoom lens of the present invention is increased in zooming from the wide end to the telephoto end. In addition, it is preferable that the aperture diameter is reduced at least at the telephoto end, in focusing from infinity to the minimum object distance.

It is preferable that the f-number be reduced near infinity which is regularly used and that the f-number is slightly increased (the aperture is closed) near the minimum object distance at which the spherical aberration variation is large and the depth of field is small. A zoom position at which the spherical aberration variation is great and the depth of field is too small is particularly a position near the telephoto end. Accordingly, it is preferable that the zoom lens is configured as described above near the telephoto end.

Next, the zoom range from the wide end to the telephoto end is normalized to 0 to 1 as described above for the sake of simplification, and a certain zoom position is referred to as Zprm. Moreover, a focus range from infinity (INF) to the minimum object distance (MOD) is normalized to 0 to X, and a certain focus position (object distance) is referred to as Fprm. In this case, the aperture diameter of the variable stop is determined by using a function f(Zprm−Fprm).

The function f(Zprm−Fprm) is a function which monotonically increases in the zoom range from 0 to 1 and in the focus range from 0 to X. In this case, the function f(Zprm−Fprm) is as follows. For example, when the zoom lens is focused at infinity (Fprm=0) at the zoom position of the telephoto end (Zprm=1), the function f(Zprm−Fprm) is as follows:

$$f(1-0).$$

Meanwhile, when the zoom lens is focused at the minimum object distance (Fprm=X) at the zoom position of the telephoto end (Zprm=1), the function f(Zprm−Fprm) is as follows:

$$f(1-X).$$

The aperture diameter of the variable stop according to the function f(Zprm−Fprm) is expressed as follows:

$$D(Zprm-Fprm).$$

For example, the aperture diameter of the variable stop in the case where the zoom lens is focused at infinity at the telephoto end is expressed as follows:

$$D(1-0).$$

Moreover, the aperture diameter of the variable stop in the case where the zoom lens is focused at the minimum object distance at the telephoto end is expressed as follows:

$$D(1-X).$$

This can facilitate the configuration of a rotation linkage mechanism in the case where the aperture diameter of the variable stop is to be changed by mechanical linkage. A driving method for changing the aperture diameter of the variable stop in this case is the same as that illustrated in FIGS. 10A and 10B except for the point that the function corresponding to the rotation of the stop rotation plate is a monotonically increasing-decreasing function for the function f (Zprm−Fprm), instead of the zoom position Zprm.

It is possible to employ, as the rotation linkage mechanism, a mechanism in which a rotation direction of the stop rotation plate is restricted by a rotation ring having an inner wall provided with cam grooves corresponding to the function f and a thrust direction is restricted by another member.

The function f(Zprm−Fprm) is implemented as the function for the cam grooves f in the inner wall by employing a configuration in which the rotation ring is moved in a forward direction for zooming and is rotated for focusing or vice versa. The function f(Zprm−Fprm) for the aperture diameter of the variable stop in this case is as illustrated in FIGS. 4 and 8 as will be described later. Moreover, the control of the aperture diameter of the variable stop may be achieved by electrical driving instead of mechanical linkage. This is preferable because the processing can be simplified.

Next, the function f(Zprm−Fprm) for the aperture diameter of the variable stop is preferably a monotonically-increasing function. When such a function is employed, the minimum f-number is constant in the zooming from the wide end to the telephoto end and the aperture diameter of the variable stop changes in a closing direction in the focusing from the infinity side to the minimum object distance side. Moreover, the change in the f-number can be easily reduced in the zooming at the minimum object distance.

Next, the value of X described above preferably satisfies the following condition.

$$0.3<X<0.8 \tag{1}$$

The conditional expression (1) is a conditional expression specifying a range of the focus position Fprm. When the value of X is greater than the upper limit value of the conditional expression (1), the aperture diameter of the variable stop at the minimum object distance at the telephoto end is smaller than the aperture diameter at infinity at the wide end. This is not preferable because the aperture is too small and a dark image is formed. When the value of X is smaller than the lower limit value of the conditional expression (1), the aperture diameter of the variable stop at the minimum object distance at the telephoto end is equal to the aperture diameter of the variable stop at infinity in an intermediate zoom range near the telephoto end. This is not preferable because the aperture is either not small enough at the minimum object distance at the telephoto end or too small at infinity in the intermediate zoom range.

Next, the aperture diameter of the variable stop preferably satisfies the following conditional expression. The aperture diameter of the variable stop according to the function f(1−0) in the case where the zoom position is at the telephoto end and the focus is at infinity is expressed as D(1−0). The aperture diameter of the variable stop according to the function f(1−X) in the case where the zoom position is at the telephoto end and the focus is at the minimum object distance is expressed as D(1−X). In this case, the aperture diameter of the variable stop preferably satisfies the following conditional expression:

$$0.6<D(1-X)/D(1-0)<0.95 \tag{2}$$

The conditional expression (2) is a conditional expression for restricting the aperture diameter D(1−X) of the variable stop at the minimum object distance side f(1−X) at the telephoto end. When D(1−X)/D(1−0) is greater than the upper limit value of the conditional expression (2), an aperture diameter difference between the maximum aperture diameter and the aperture diameter at the minimum object distance is small at the telephoto end. This is not preferable because an effect of suppressing the spherical aberration variation decreases. When D(1−X)/D(1−0) is smaller than the lower limit value of the conditional expression (2), the f-number on the minimum object distance side is too large. This is not preferable because an image is too dark and the depth of field is too large.

A configuration in each embodiment is described below. In the zoom lens in each embodiment, the minimum f-number is constant in the entire zoom range. The f-number of the zoom lens changes in focusing. Moreover, the zoom lens in each embodiment includes, in addition to the aforementioned variable stop, the main stop which determines the f-number of the zoom lens.

In Embodiment 1, the zoom lens is configured by the following lens units which are arranged in the order of description from the object side to the image side. The zoom lens is configured by a first lens unit L1 with a negative refractive power, a second lens unit L2 with a positive refractive power, a third lens unit L3 with a positive refractive power, a fourth lens unit L4 with a negative refractive power, and a fifth lens unit L5 with a positive refractive power. The zoom lens in Embodiment 1 is a zoom lens which has a zoom ratio of about 2.06 and which includes five lens units.

In the zooming from the wide end to the telephoto end, the first lens unit L1 moves toward the image side and the second lens unit L2 to the fifth lens unit L5 move to the object side. Reference sign SP denotes the main stop (aperture stop) which determines the f-number of the zoom lens. Reference sign SSP denotes the supplemental stop whose aperture diameter is variable and corresponds to the aforementioned variable stop.

The main stop SP moves along the same trajectory as the third lens unit L3. The supplemental stop SSP moves along the same trajectory as the fourth lens unit L4. The supplemental stop SSP changes the aperture diameter along the trajectory of the monotonically increasing function as illustrated in FIG. 4. This facilitates correction of the spherical aberration on the minimum object distance side with the f-number (Fno) being constant in the entire zoom range. In this case, the maximum focus position Fprm(X) in the aforementioned conditional expression (1) is 0.4 and the conditional expression (1) is satisfied.

According to the numerical embodiment 1 to be described later, the aperture diameter according to the function f(1−0) is as follows:

$$D(1-0)=25.63.$$

Moreover, the aperture diameter according to the function f(1−X) is as follows:

$$D(1-0.4)=22.00.$$

Thus, the conditional expression (2) is as follows:

$$D(1-0.4)/D(1-0)=0.858.$$

In other words, the aperture diameter of the supplemental stop (variable stop) SSP at each of infinity and the minimum object distance at the telephoto end satisfies the conditional expression (2) and the f-number at the minimum object distance at the telephoto end is an appropriate value.

In Embodiment 2, the zoom lens is configured by the following lens units which are arranged in the order of description from the object side to the image side. The zoom lens is configured by a first lens unit L1 with a positive refractive power, a second lens unit L2 with a negative refractive power, a third lens unit L3 with a positive refractive power, and a fourth lens unit L4 with a positive refractive power. The zoom lens in Embodiment 2 is a zoom lens which has a zoom ratio of about 2.78 and which includes four lens units. In the zooming from the wide end to the telephoto end, the first lens unit L1, the third lens unit L3, and the fourth lens unit L4 move toward the object side and the second lens unit L2 moves along a trajectory protruding toward the image side. Reference sign SP denotes the main stop (aperture stop). Reference sign SSP denotes the supplemental stop (variable stop).

The main stop SP and the supplemental stop SSP move along the same trajectory as the third lens unit L3. The supplemental stop SSP changes the aperture diameter along the trajectory of the monotonically increasing function as illustrated in FIG. 8. This facilitates correction of the spherical aberration at the minimum object distance side with the f-number (Fno) being constant in the entire zoom range. In this case, the maximum focus position Fprm(X) in the aforementioned conditional expression (1) is 0.5 and the conditional expression (1) is satisfied.

Moreover, according to the numerical embodiment 2 to be described later, the aperture diameter according to the function f(1−0) is as follows:

$$D(1-0)=25.63.$$

Moreover, the aperture diameter according to the function f(1−X) is as follows:

$$D(1-0.5)=21.70.$$

Thus, the following is established:

$$D(1-0.5)/D(1-0)=0.847.$$

In other words, the aperture diameter of the supplemental stop (variable stop) SSP at each of infinity and the minimum object distance at the telephoto end satisfies the conditional expression (2) and the f-number at the minimum object distance at the telephoto end is an appropriate value.

Next, an example in which the zoom lens illustrated in Embodiments 1 and 2 are applied to an image pickup device is described by using FIG. 11. FIG. 11 is a schematic diagram of a main portion of a single-lens reflex camera. In FIG. 11, reference numeral 10 denotes an image pickup lens including the zoom lens 1 of Embodiments 1 and 2. The zoom lens 1 is held in a lens barrel 2 which is a holding member. Reference numeral 20 denotes a camera main body and the camera main body 20 is configured by a quick return mirror 3 which reflects a light flux from the image pickup lens 10 upward and a focusing screen 4 which is disposed in an image formation apparatus for the image pickup lens 10. Furthermore, the camera main body 20 is further configured by a roof pentaprism 5 which converts an inverted image formed on the focusing screen 4 to an erected image, an eyepiece 6 which is used to observe the erected image, and the like.

Reference numeral 7 denotes a photosensitive surface and a sliver-halide film or an image pickup element (photoelectric conversion element) such as a CCD sensor or a CMOS sensor which receives light of an image formed by the zoom lens is disposed on the photosensitive surface 7. In image pickup, the quick return mirror 3 retreats from an optical path and an image is formed on the photosensitive surface 7 by the image pickup lens 10.

The benefits described in Embodiments 1 and 2 are effectively obtained in the image pickup apparatus as disclosed in this embodiment. A mirrorless single-lens camera which has no quick return mirror 3 can be similarly employed as the image pickup apparatus. Moreover, the present invention can be applied to an image pickup apparatus which has a zoom lens like one described above and can be also applied to image projection apparatuses and other various optical apparatuses.

Next, numerical embodiments in Embodiments of the present invention are described. In the numerical embodiments, reference sign i denotes the number assigned to each surface in the order from the object side, ri denotes the radius of curvature of each lens surface, di denotes a lens thickness or an air gap between the i-th surface and the (i+1)th surface, and ndi and vdi denote, respectively, the refractive index and the Abbe number at the d-line. Reference sign BF denotes the backfocus and refers to a distance from the last lens surface to the image plane. The total lens length refers to a distance from the first lens surface to the image plane. An aspherical shape is expressed by the following expression, provided that: the direction of the optical axis is an X-axis; the direction perpendicular to the optical axis is an H-axis; the direction in which the light travels is positive; R is a radius of paraxial curvature, K is a conic constant; and A4, A6, A8, A10, and A12 are aspherical coefficients.

$$X = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12}$$

Moreover, [e-X] means $[X10^{-X}]$. Aspherical surfaces are shown with the reference sign * added after the surface numbers. Moreover, each of portions where the gap d between the optical surfaces is described as (variable) is a portion in which the gap d changes in the zooming, and the surface gap corresponding to each focal length is described in a separate table.

Furthermore, each of portions in which the effective diameter of the optical surface is described as (variable) is the variable stop whose effective diameter changes in zooming and focusing. In a separate table, the variable surface number is described as "eai" and the effective diameter corresponding to each focal length is described. For example, the numerical value corresponding to the aperture diameter of the supplemental stop 22 in the numerical embodiment 1 is as follows. ea22inf: the aperture diameter at each zoom position in the case where the focus is at infinity.

For example, at the wide end, D(0-0)=17.11 according to the function f(0-0).

For example, at the telephoto end, D(1-0)=25.63 according to the function f(1-0).

ea22 mod: the aperture diameter at each zoom position in the case where the focus is at the minimum object distance.

For example, at the wide end, D(0-0.4)=16.50 according to the function f(0-0.4).

For example, at the telephoto end, D(1-0.4)=22.00 according to the function f(1-0.4).

This applies also to the numerical embodiment 2 in the same way as the numerical embodiment 1. Moreover, Table 1 describes relationships of each of the numerical embodiments with the parameters and the conditional expressions which are described above.

Numerical Embodiment 1

[unit: mm]

Surface data

| Surface number | r | d | nd | vd | Effective diameter |
|---|---|---|---|---|---|
| 1 | ∞ | 1.50 | | | 73.20 |
| 2* | ∞ | 2.70 | 1.88300 | 40.8 | 54.72 |
| 3* | 22.087 | 5.81 | | | 38.48 |
| 4* | 35.369 | 2.40 | 1.55332 | 71.7 | 38.40 |
| 5* | 26.617 | 10.90 | | | 34.86 |
| 6 | −52.848 | 1.80 | 1.83481 | 42.7 | 34.78 |
| 7 | 203.581 | 1.61 | | | 35.43 |
| 8 | 67.731 | 7.32 | 1.68893 | 31.1 | 36.68 |
| 9 | −63.628 | (variable) | | | 36.71 |
| 10 | 2453.700 | 2.27 | 1.74077 | 27.8 | 28.99 |
| 11 | −144.408 | 0.15 | | | 29.01 |
| 12 | 48.027 | 1.50 | 1.80518 | 25.4 | 29.95 |
| 13 | 20.159 | 8.03 | 1.72047 | 34.7 | 29.23 |
| 14 | 126.334 | (variable) | | | 29.13 |
| 15 | 59.873 | 1.50 | 1.80100 | 35.0 | 29.82 |
| 16 | 31.647 | 6.94 | 1.59522 | 67.7 | 29.26 |
| 17 | −79.276 | (variable) | | | 29.14 |
| 18 (aperture stop) | ∞ | 3.72 | | | 25.59 |
| 19 | −63.584 | 1.25 | 1.80610 | 40.9 | 24.75 |
| 20 | 22.699 | 4.73 | 1.80518 | 25.4 | 24.74 |
| 21 | 104.459 | 3.50 | | | 24.74 |
| 22 (supplemental stop)∞ | ∞ | (variable) | | | (variable) |
| 23 | 21.821 | 8.70 | 1.43875 | 94.9 | 25.58 |
| 24 | −44.402 | 0.15 | | | 24.75 |
| 25* | 194.175 | 1.40 | 1.85400 | 40.4 | 23.70 |
| 26 | 17.672 | 9.74 | 1.49700 | 81.5 | 23.58 |
| 27 | −56.579 | (variable) | | | 25.31 |
| 28 | ∞ | | | | 27.70 |

Aspheric Surface data

2nd surface

K = 0.00000e+000
A4 = 1.88349e−005
A6 = −2.19275e−008
A8 = 1.13152e−011
A10 = 1.63975e−015
A12 = −3.28448e−018

3rd surface

K = 0.00000e+000
A4 = −1.30746e−005
A6 = 6.18453e−008
A8 = −8.17198e−011
A10 = −6.46977e−014
A12 = 3.79639e−016

4th surface

K = 0.00000e+000
A4 = −1.97180e−005
A6 = 7.51396e−008
A8 = −3.42552e−011
A10 = −2.03193e−014
A12 = −4.70364e−018

5th surface

K = −2.42247e−001
A4 = 1.84646e−005
A6 = −4.06638e−010
A8 = 1.38889e−010
A10 = −5.35901e−013
A12 = −8.87147e−019

25th surface

K = 0.00000e+000
A4 = −1.09759e−005
A6 = −1.41529e−008

-continued

[unit: mm]

A8 = −1.43989e−011
A10 = 8.16486e−016
A12 = −1.54864e−016

Various data
Zoom ratio 2.06

|  | Wide angle | Middle | Telephoto |
|---|---|---|---|
| Focal length | 16.48 | 23.60 | 33.95 |
| F-number | 2.90 | 2.90 | 2.90 |
| Half angle of view (deg) | 52.70 | 42.51 | 32.51 |
| Image height | 21.64 | 21.64 | 21.64 |
| Total lens length | 173.75 | 162.85 | 160.00 |
| BF | 38.00 | 38.00 | 38.00 |
| d9 | 34.27 | 14.45 | 1.00 |
| d14 | 7.10 | 8.88 | 5.97 |
| d17 | 0.50 | 5.71 | 9.27 |
| d22 | 6.27 | 1.06 | −2.50 |
| d27 | 0.00 | 7.14 | 20.65 |
| ea22inf | 17.11 | 19.74 | 25.63 |
| ea22mod | 16.50 | 18.00 | 22.00 |

Lens unit data

| Unit | Start surface | Focal length | Lens structure length | Front principal point position | Rear principal point position |
|---|---|---|---|---|---|
| 1 | 1 | −26.28 | 34.03 | 0.58 | −32.94 |
| 2 | 10 | 77.25 | 11.96 | −1.34 | −8.03 |
| 3 | 15 | 70.69 | 8.44 | 2.38 | −2.92 |
| 4 | 18 | −48.19 | 13.20 | 4.95 | −5.53 |
| 5 | 23 | 45.36 | 19.99 | 3.11 | −11.39 |

Numerical Embodiment 2

[unit: mm]

Surface data

| Surface number | r | d | nd | vd | Effective diameter |
|---|---|---|---|---|---|
| 1 | ∞ | 1.65 |  |  | 73.26 |
| 2 | 204.560 | 2.10 | 1.84666 | 23.9 | 68.66 |
| 3 | 72.156 | 7.40 | 1.77250 | 49.6 | 64.50 |
| 4 | 333.009 | 0.15 |  |  | 63.84 |
| 5 | 56.551 | 6.70 | 1.77250 | 49.6 | 59.01 |
| 6 | 147.768 | (variable) |  |  | 57.87 |
| 7* | 107.703 | 1.60 | 1.88300 | 40.8 | 33.53 |
| 8 | 16.578 | 7.87 |  |  | 24.69 |
| 9 | −46.474 | 1.15 | 1.59522 | 67.7 | 23.67 |
| 10 | 21.417 | 4.45 | 1.88300 | 40.8 | 21.26 |
| 11 | 67.901 | 1.27 |  |  | 19.98 |
| 12 | 129.834 | 3.48 | 1.59270 | 35.3 | 20.65 |
| 13 | −49.739 | 1.61 |  |  | 21.37 |
| 14 | −23.347 | 1.15 | 1.72916 | 54.7 | 21.43 |
| 15 | 404.189 | 2.69 | 1.84666 | 23.9 | 23.86 |
| 16 | −57.801 | (variable) |  |  | 24.55 |
| 17 | ∞ | 1.90 |  |  | (variable) |
| 18 (stop) | ∞ | 0.00 |  |  | 26.94 |
| 19 | 27.563 | 1.45 | 1.88300 | 40.8 | 30.03 |
| 20 | 21.253 | 11.00 | 1.49700 | 81.5 | 29.21 |
| 21 | −64.876 | 0.20 |  |  | 29.58 |
| 22 | 43.054 | 2.70 | 1.58313 | 59.4 | 29.26 |
| 23* | 63.670 | 4.61 |  |  | 28.62 |
| 24 | −44.565 | 1.40 | 1.72047 | 34.7 | 28.59 |
| 25 | −153.891 | (variable) |  |  | 29.25 |
| 26 | 31.112 | 7.13 | 1.43875 | 94.9 | 30.54 |
| 27 | −203.991 | 0.20 |  |  | 30.08 |
| 28 | 47.466 | 5.85 | 1.49700 | 81.5 | 30.47 |
| 29 | −71.666 | 1.96 |  |  | 30.22 |
| 30* | −205.992 | 2.10 | 1.85006 | 40.2 | 28.71 |
| 31* | 88.343 | 2.63 |  |  | 27.92 |
| 32 | −442.074 | 1.40 | 1.83400 | 37.2 | 28.02 |
| 33 | 61.478 | 5.17 | 1.51633 | 64.1 | 28.80 |
| 34 | −61.478 |  |  |  | 29.46 |

Aspheric Surface data

7th surface

K = 0.00000e+000
A4 = 7.12736e−006
A6 = −9.11631e−009
A8 = 2.35269e−011
A10 = −5.05824e−014
A12 = 7.73415e−017

23th surface

K = 0.00000e+000
A4 = 5.39187e−006
A6 = 5.52428e−009
A8 = −8.87533e−012
A10 = 1.15050e−013
A12 = −9.43064e−017

30th surface

K = 0.00000e+000
A4 = 2.73309e−005
A6 = −1.56548e−007
A8 = 3.98764e−010
A10 = −7.46700e−013
A12 = 6.95925e−016

31th surface

K = 0.00000e+000
A4 = 4.43162e−005
A6 = −1.34466e−007
A8 = 3.25418e−010
A10 = −4.48417e−013
A12 = 2.53228e−016

Various data
Zoom ratio 2.75

|  | Wide angle | Middle | Telephoto |
|---|---|---|---|
| Focal length | 24.70 | 34.91 | 67.88 |
| F-number | 2.91 | 2.91 | 2.91 |
| Half angle of view (deg) | 41.22 | 31.79 | 17.68 |
| Image height | 21.64 | 21.64 | 21.64 |
| Total lens length | 156.33 | 163.86 | 187.69 |
| BF | 38.09 | 46.60 | 63.40 |
| d6 | 2.75 | 11.74 | 30.36 |
| d16 | 13.71 | 7.72 | 0.23 |
| d25 | 8.82 | 4.84 | 0.74 |
| ea17inf | 18.54 | 20.67 | 25.63 |
| ea17mod | 16.80 | 17.80 | 21.70 |

Lens unit data

| Unit | Start surface | Focal length | Lens structure length | Front principal point position | Rear principal point position |
|---|---|---|---|---|---|
| 1 | 1 | 106.37 | 18.00 | 3.15 | −7.63 |
| 2 | 7 | −16.39 | 25.26 | 2.87 | −15.39 |
| 3 | 17 | 57.88 | 23.26 | −3.01 | −18.40 |
| 4 | 26 | 46.04 | 26.44 | 1.17 | −18.24 |

TABLE 1

|  | Numerical Embodiment 1 | Numerical Embodiment 2 |
| --- | --- | --- |
| Lens type of zoom lens | NPPNP | PNPP |
| Conditional Expression (1) | 0.4 | 0.5 |
| Conditional Expression (2) | 0.858 | 0.847 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-255053, filed Dec. 28, 2016, which is hereby incorporated by reference herein in its entirety.

What is claimed is:

1. A zoom lens comprising a variable stop whose aperture diameter is variable in zooming, wherein
the variable stop is configured to determine a minimum f-number of the zoom lens at least at one of zoom positions in an entire zoom range,
the aperture diameter of the variable stop is variable in focusing at least at a telephoto end in the entire zoom range, and
the following conditional expression is satisfied:

$$0.6 < D_{(1-X)}/D_{(1-0)} < 0.95,$$

where $D_{(1-0)}$ is the aperture diameter when being focused on infinity at the telephoto end, and $D_{(1-X)}$ is the aperture diameter when being focused on a minimum object distance at the telephoto end.

2. The zoom lens according to claim 1, wherein the aperture diameter of the variable stop decreases in focusing from infinity to the minimum object distance.

3. The zoom lens according to claim 1, wherein the aperture diameter of the variable stop increases in zooming from a wide end to the telephoto end.

4. The zoom lens according to claim 1, wherein the aperture diameter of the variable stop is determined according to a position of a lens unit configured to move for zooming and a position of a lens unit configured to move for focusing.

5. The zoom lens according to claim 1, wherein the aperture diameter when being focused on the infinity at the telephoto end is larger than the aperture diameter when being focused on the minimum object distance at a wide end.

6. The zoom lens according to claim 1, wherein the minimum f-number of the zoom lens is constant in the entire zoom range.

7. The zoom lens according to claim 1, further comprising a main stop which determines an f-number of the zoom lens.

8. The zoom lens according to claim 1, wherein the aperture diameter when being focused on infinity at a wide end is larger than the aperture diameter when being focused on the minimum object distance at the wide end.

9. The zoom lens according to claim 1, wherein the aperture diameter when being focused on the minimum object distance at the telephoto end is larger than the aperture diameter when being focused on infinity at a wide end.

10. The zoom lens according to claim 5, wherein the aperture diameter when being focused on infinity at the wide end is larger than the aperture diameter when being focused on the minimum object distance at the telephoto end.

11. The zoom lens according to claim 5, wherein the aperture diameter when being focused on the minimum object distance at the telephoto end is larger than the aperture diameter when being focused on infinity at the wide end.

12. The zoom lens according to claim 10, wherein the aperture diameter when being focused on the minimum object distance at the telephoto end is larger than the aperture diameter when being focused on infinity at the wide end.

13. An image pickup apparatus comprising:
a zoom lens; and
an image pickup element which receives a light image formed by the zoom lens, wherein
the zoom lens includes a variable stop whose aperture diameter is variable in zooming,
the variable stop is configured to determine a minimum f-number of the zoom lens,
the aperture diameter of the variable stop is variable in focusing at least at a telephoto end in an entire zoom range, and
the following conditional expression is satisfied:

$$0.6 < D_{(1-X)}/D_{(1-0)} < 0.95,$$

where $D_{(1-0)}$ is the aperture diameter when being focused on infinity at the telephoto end, and $D_{(1-X)}$ is the aperture diameter when being focused on a minimum object distance at the telephoto end.

* * * * *